Sept. 16, 1952 J. F. FRAZIER 2,611,069
ELECTRIC APPLIANCE AND STAND ASSEMBLY THEREFOR
Filed Feb. 5, 1948 5 Sheets-Sheet 1

Inventor
JOHN F. FRAZIER
By
F. H. Knight
Attorney

Sept. 16, 1952 J. F. FRAZIER 2,611,069
ELECTRIC APPLIANCE AND STAND ASSEMBLY THEREFOR
Filed Feb. 5, 1948 5 Sheets-Sheet 2
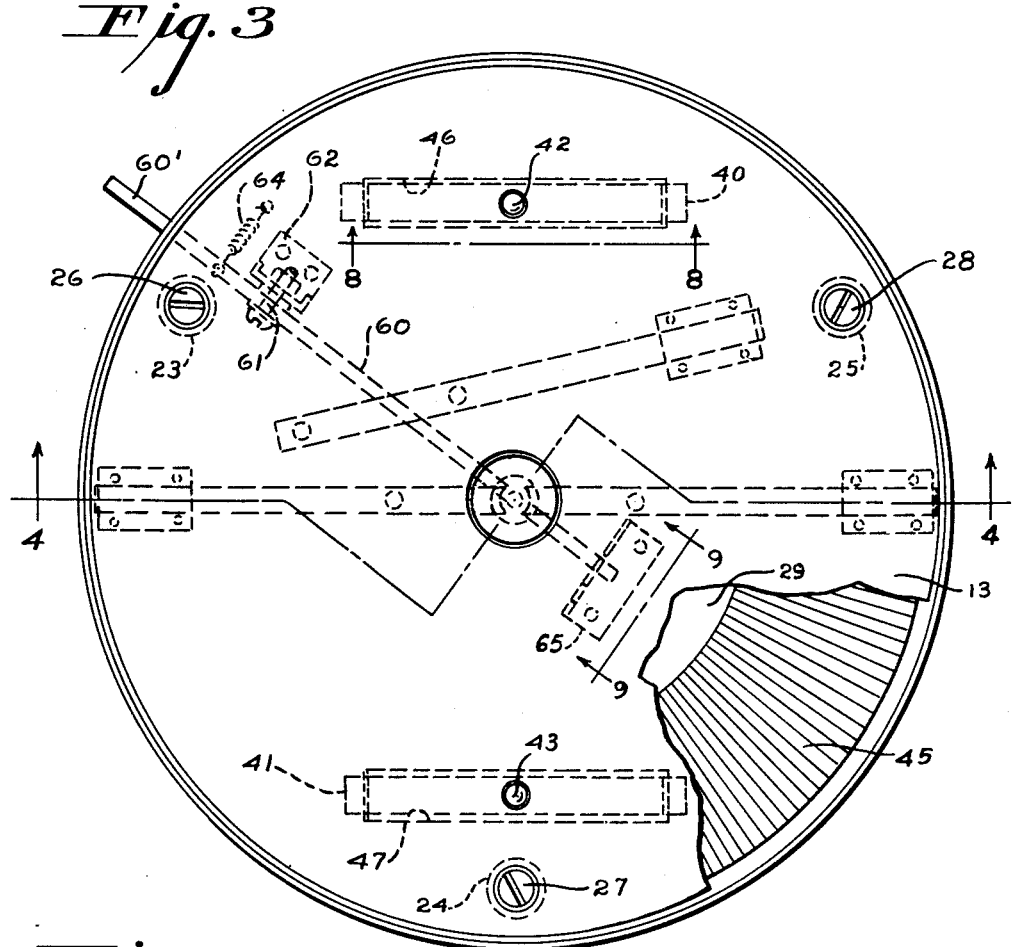
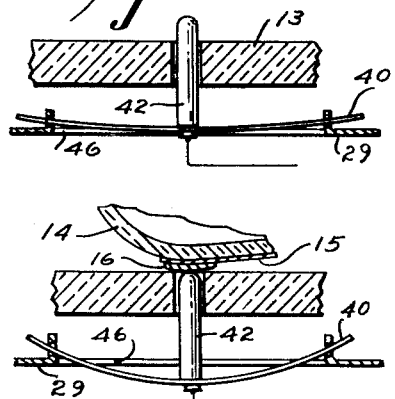
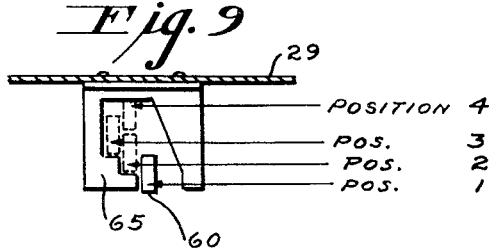
Inventor
JOHN F. FRAZIER
By
F. W. Knight
Attorney Sept. 16, 1952  J. F. FRAZIER  2,611,069
ELECTRIC APPLIANCE AND STAND ASSEMBLY THEREFOR
Filed Feb. 5, 1948  5 Sheets-Sheet 3

Inventor
JOHN F. FRAZIER
By F. H. Knight
Attorney

Sept. 16, 1952　　　　J. F. FRAZIER　　　　2,611,069
ELECTRIC APPLIANCE AND STAND ASSEMBLY THEREFOR
Filed Feb. 5, 1948　　　　　　　　　　　　　5 Sheets-Sheet 4

Inventor
JOHN F. FRAZIER
Attorney

Sept. 16, 1952      J. F. FRAZIER      2,611,069
ELECTRIC APPLIANCE AND STAND ASSEMBLY THEREFOR
Filed Feb. 5, 1948      5 Sheets-Sheet 5
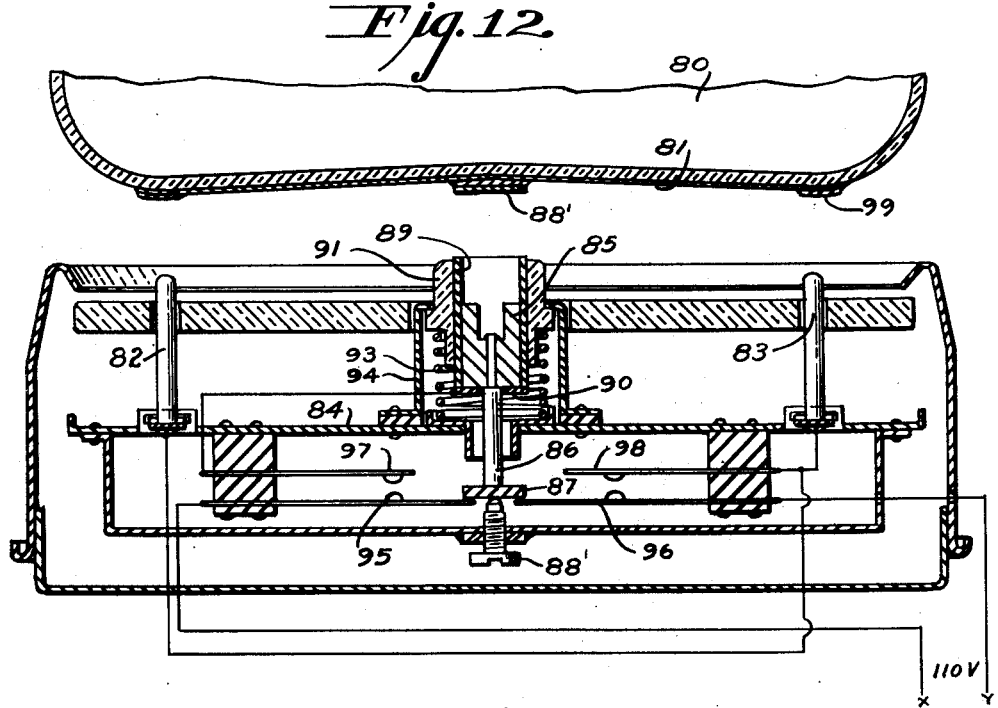
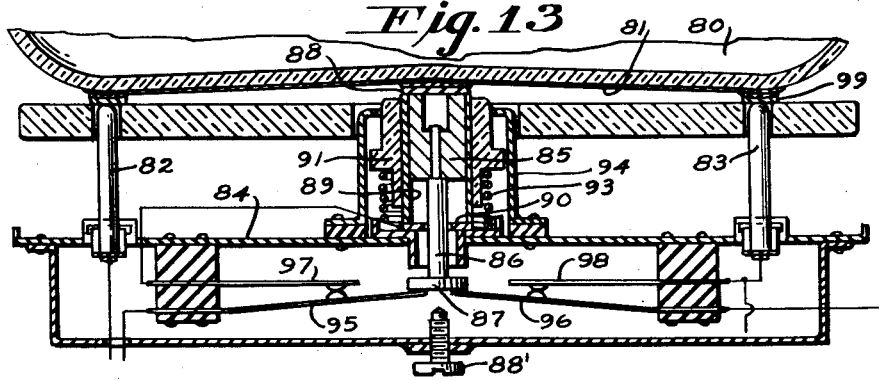
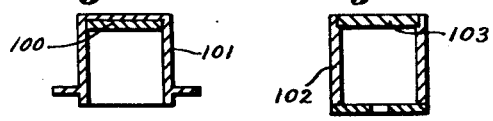
Inventor
JOHN F. FRAZIER

UNITED STATES PATENT OFFICE 2,611,069

ELECTRIC APPLIANCE AND STAND ASSEMBLY THEREFOR

John F. Frazier, Corning, N. Y., assignor to Corning Glass Works, Corning, N. Y., a corporation of New York Application February 5, 1948, Serial No. 6,468

5 Claims. (Cl. 219—43)

The present invention relates to electrically heated appliances having their heating elements integral therewith, and being adapted for use with specially designed stands arranged to supply the heating elements with operating current.

In general, the prime objects of the invention are devices of the foregoing character which will efficiently perform the purposes for which they are intended, which are simple and economical of construction and which can be expeditiously and conveniently manipulated.

Other objects of the invention are appliance supports or stands of the foregoing character which afford maximum protection to the user against electrical shock.

A further object of the invention is a novel form of manually controlled vacuum coffee maker having a heating element integral therewith and a specially designed stand for supplying operating current to its heating element.

A still further object of the invention is an automatic vacuum coffee maker and stand embodying features in common with those embodied in the manually controlled vacuum coffee maker.

A still further object of the invention is a stand assembly having current-supply electrodes to which power is automatically supplied for energizing the heating element of a vessel consequent to the arrangement of a vessel thereon.

Further objects and features of the invention will become apparent from a further perusal of the specification when considered in connection with the accompanying drawings forming a part thereof.

In the accompanying drawings Fig. 1 is a side elevation of a manually controlled vacuum coffee maker and stand therefor embodying the invention.

Fig. 3 is an enlarged top plan view of the stand assembly of Fig. 1 with certain parts broken away.

Fig. 8 is a sectional view taken on line 8—8 in Fig. 3.

Fig. 8a is a view similar to Fig. 8 but showing parts in their operated position.

Fig. 9 is a view taken on line 9—9 in Fig. 3.

Fig. 12 is a sectional elevation of a stand assembly which automatically supplies power to its electrodes when a vessel is arranged thereon, and also shows a fragment of a vessel in section cooperative therewith.

Fig. 13 is a view similar to Fig. 12 but showing the vessel arranged on the stand so that the parts within the stand are in their alternative position.

Figs. 14 and 15 are sectional side-elevation views of alternative forms of central electrode assemblies.

Figure 1:
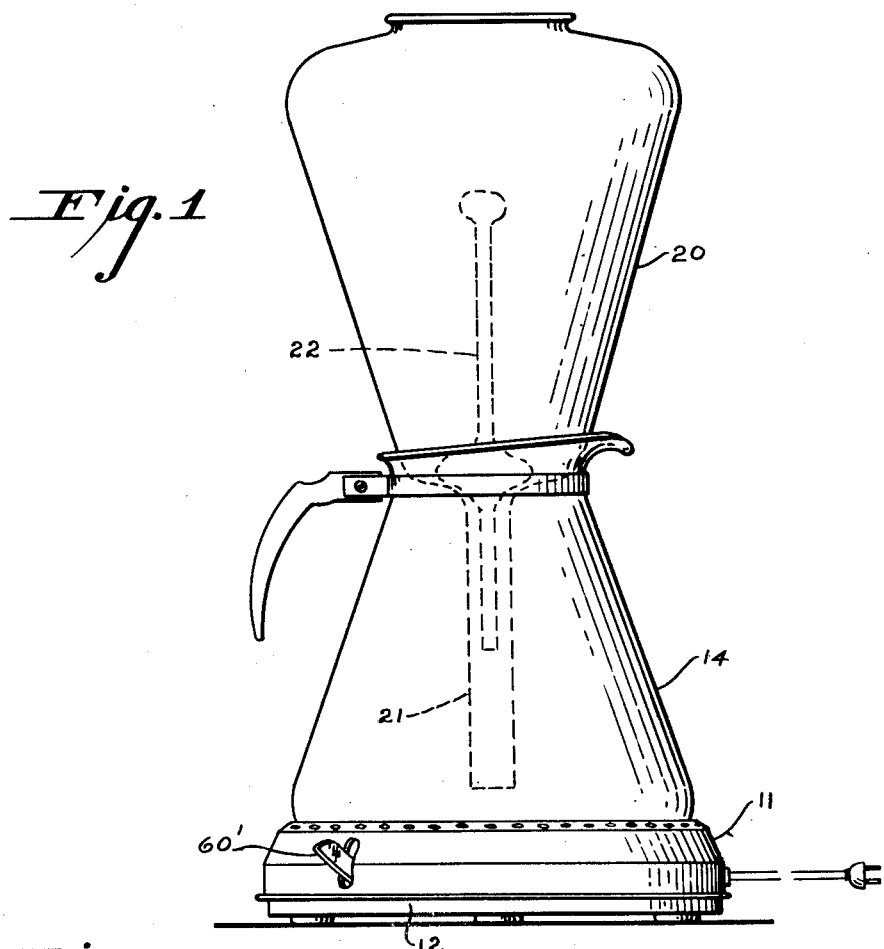

In brief, the stand portion of the invention as illustrated in Figs. 1-9 comprises a base or stand assembly having a surrounding shell 11, a base 12, and a vessel support 13. The lower bowl 14 of the vacuum coffee maker shown differs from conventional coffee maker lower bowls in that it has a slightly reentrant or conical-shaped bottom, and on its underside is provided with a heating element comprising an electrically conductive coating 15 integrally attached to the glass. The peripheral portion of the coating 15 is provided with a terminal 16 comprising a low-resistance metallized coating in the form of a flat, circular band. Centrally disposed on the coating 15 is a similar low-resistance coating 17 to which is attached, by soldering, for example, a terminal 18 composed of a suitable Curie point alloy and serving as an armature for a purpose which will hereinafter be described. The electrically conductive coating employed as the heating element may be produced by spraying the bottom surface of the vessel, while heated, with tin chloride or other tin salt with additives. The low-resistance coating 17 and terminal 16 may be formed by applying a silver metallizing composition and firing it on the glass in known manner.

The upper bowl 20 of the coffee maker may have its bottom portion, where engaging the lower bowl, ground to produce a hermetic seal between it and the lower bowl. As an alternative, however, a conventional form of gasket may be employed between the two bowls to obtain the necessary seal, as is required in vacuum coffee makers. The upper bowl 20 is provided with the usual tubulation 21 and a suitable filter 22.

Figure 2:
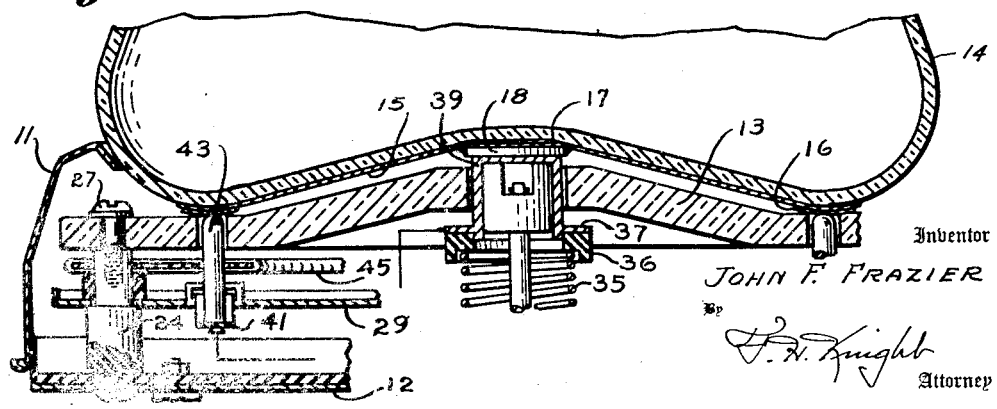
Fig. 2 is an enlarged fragmentary view in section of the lower portion of the assembly shown in Fig. 1.
Figure 4:
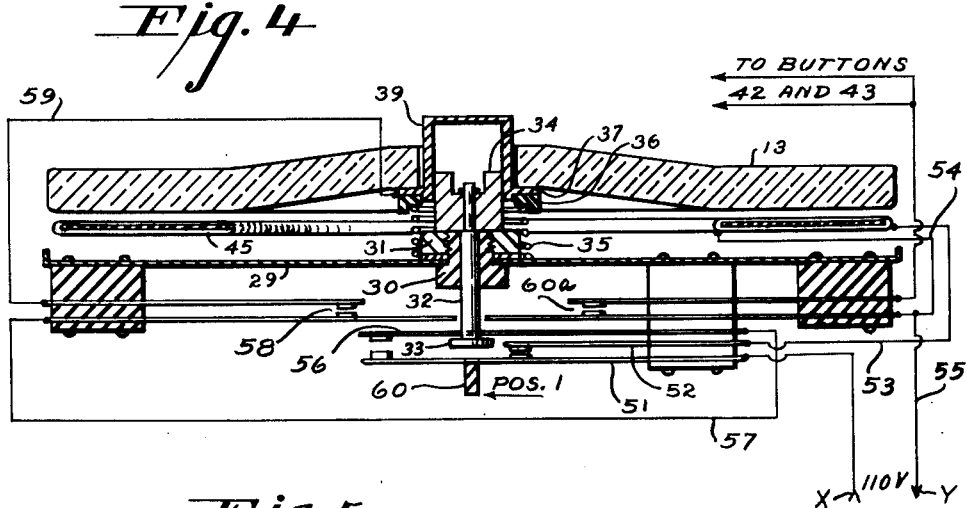
Fig. 4 is a sectional elevation along line 4—4 of Fig. 3.
Figure 5:
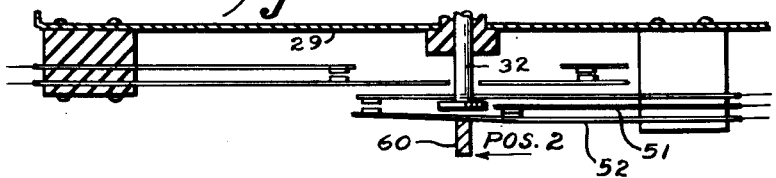
Fig. 5 is a fragmentary view of the apparatus of Fig. 4 showing certain of the parts in an alternative position.
Figure 6:
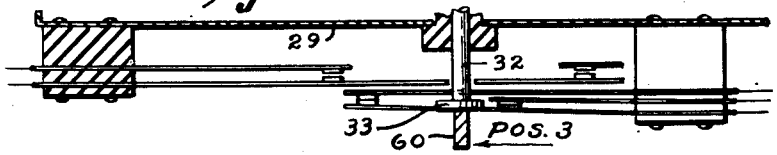
Fig. 6 is a view similar to Fig. 5 but showing additional parts in an alternative position.

The base 12 of the stand assembly is provided with upstanding posts 23—25 of insulating material. The upper half of these posts is of reduced diameter, as shown in Fig. 2. A suitable circuit-controlling apparatus support 29 is apertured and threaded over the reduced portions of posts 23—25. Support 29 (Fig. 4) also has a central aperture thru which an insulating bushing 30 is threaded into a nut 31. Passing thru bushing 30 is a post 32 of insulating material having a contact actuating disk 33 on its bottom end and having a permanent magnet 34 attached to its upper end. Surrounding nut 31 is a helical spring 35 on top of which is arranged an insulating spring retainer 36 arranged against the undersurface of a flange 37 extending laterally from a non-magnetic cap electrode 39 surrounding magnet 34. The spring 35 is held partly compressed between support 29 and retainer 36 by the vessel or lower bowl support 13, which is attached to the top ends of the posts 23—25 by screws 26—28. The circuit control apparatus support 29 near two of its opposite edges is provided with rectangular cut-outs 46 and 47 (Figs. 3, 8 and 8a) and is turned up at the ends thereof and slotted to receive leaf springs 40 and 41 to which are attached, at points intermediate their ends, electrodes, posts or buttons 42 and 43 respectively. These electrodes normally project thru the vessel support 13, as illustrated in Fig. 8, and are moved to the alternative position illustrated in Fig. 8a when a vessel is arranged on support 13. Arranged between supports 13 and 29 is an annular wire-wound heating element 45.

Arranged on the underside of support 29 are the necessary contact spring assemblies for supplying operating current to the electrodes 42 and 43, to the cap electrode 39, and to the wire-wound heating element 45. The circuit for the wire-wound heating element 45 extends from the X terminal of a suitable current source thru contact springs 51 and 52, conductor 53, the winding of heating element 45, and conductors 54 and 55, to the Y terminal of the same current source. The operating current for the heating element or conductive coating 15 of the vessel is supplied to the cap electrode 39 from the X terminal of the current source thru contact springs 51 and 56, conductor 57, contacts 58, and conductor 59. The path to the electrodes 42 and 43 extends from the Y terminal of the same current source over conductor 55 and thru contacts 60a to the electrodes or buttons 42 and 43.

The contact springs 51, 52, and 56 are adapted to be manually closed by a lever 60 (Fig. 3), pivoted at 61 on a bracket 62, arranged on base 12. Lever 60 is biased to the position shown in Figs. 4 and 9, designated position 1, by a spring 64. The end of the lever 60 terminating within the assembly is cooperative with a latch member 65 having steps by means of which the lever can be held in positions 2 or 3, and can be moved to a position designated 4. The end 60' of lever 60 extends out thru shell 11 so it is available for manual manipulation to its respective positions at will. As will be observed from an inspection of Figs. 4–7, when the lever is in position 1, contact springs 51 and 52, and 51 and 56 are separated so that operating current cannot reach either the winding 45 or the stand electrodes. In position 2 contact springs 51 and 52 are closed so that operating current is supplied to heating element 45. In position 3, contact springs 51 and 56 are also closed, but since contacts 58 and 60a are still open, operating current has not yet been applied to the electrodes.

Figure 7:
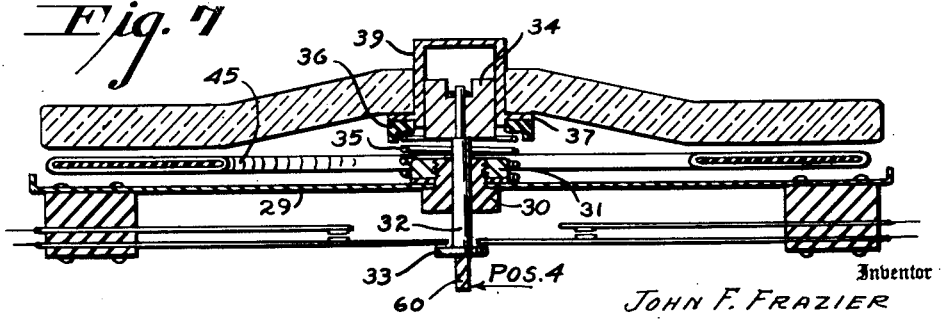
Fig. 7 is a view similar to Fig. 4 but with certain parts omitted and other parts shown in an alternative position.

When the lever 60 is moved to position 4, it engages disk 33 on the bottom of post 32 and moves the post 32 and magnet 34 upward to the position shown in Fig. 7, thus separating the magnet from the nut 31, which is made of magnetic material and serves as a magnet-retaining armature. Having the magnet 34 normally magnetically attracted to nut 31 is a safety feature, as it prevents movement of the magnet to its upper or power-applying position by gravity should one handling the stand invert the same. If the vessel 20 is arranged on support 13 at the time lever 60 is raised to position 4, the cap electrode 39 will have been depressed to the position shown in Fig. 2, and the permanent magnet 34 will have been brought close enough to the armature terminal 18 on the vessel to become attracted to it. This further movement of magnet 34 from the position shown in Fig. 7 to the position in which it is shown in Fig. 2, brings about the closure of contact springs 58 and 60a so that operating current is supplied to the electrodes 39, 42, and 43, and to the terminals 16 and 18 of the vessel heating element or coating 15.

*Manual coffee maker operation*

With the coffee maker assembly readied for coffee making and arranged on the stand assembly, an attendant moves lever 60 momentarily to position 4. In doing this, magnet 34 is forced away from nut 31 and brought into magnetically attractive relation with the armature terminal 18. The magnet 34 is accordingly attracted to its uppermost position in which, thru the medium of post 32, disk 33, and contacts 58 and 60a, it closes the traced circuits to electrodes 39, 42, and 43. The attendant then permits the return of lever 60 to position 3.

After the liquid in vessel 20 has been sufficiently heated, it is forced into the upper bowl in the usual manner. After the attendant has decided that the coffee has brewed for a period to give the brew the required strength, he moves the lever from position 3 to position 2, thereby separating contact spring 51 from spring 56 to open the circuit to the vessel heating element. As will be understood, the heat output of the heating element 45 is insufficient to maintain brew in the upper bowl so that in due time the brew returns to the lower bowl where it is maintained at a desired temperature for use by the heat output of heating element 45. Obviously, whether or not the attendant employs the auxiliary heating element 45 is wholly optional, since he can return lever 60 directly from position 3 to position 1 if he desires to do so.

As an alternative to moving lever 60 from position 3 to position 2, the attendant can break the circuits to the electrodes by momentarily slightly raising bowl 20 off the stand to allow magnet 34 to drop to its initial position and thus open contacts 58 and 60a.

*Heating element safety features*

To protect the bowl heating element 15 against becoming overheated, the armature 18 constituting the central terminal of the heating element is made of a ferromagnetic alloy of such composition that it rapidly approaches its Curie point in the absence of sufficient liquid in the bowl. Since the area occupied by the armature is in the highest portion of the bowl bottom, this area will become exposed at the beginning of a boil-dry condition and thereafter rapidly with the armature approaches the temperature which is the Curie point of the armature. As this temperature is being approached, the magnet 34 will drop away and open the circuit to the heating element 15.

*Automatic vacuum coffee maker*

Figure 10:
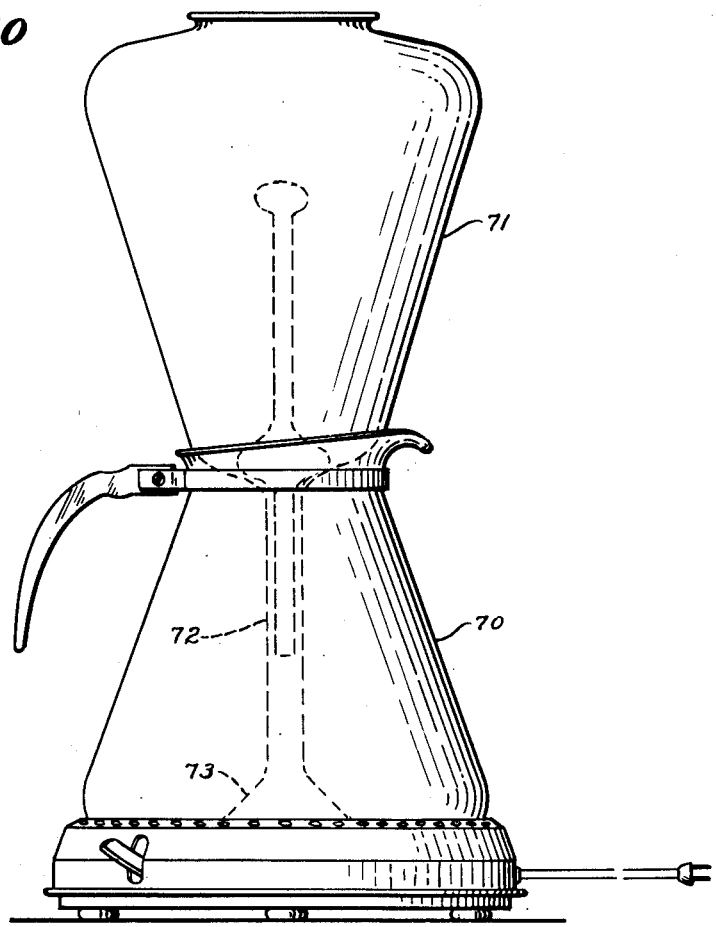
Fig. 10 is a side elevation of the automatically controlled vacuum coffee maker and stand assembly.
Figure 11:
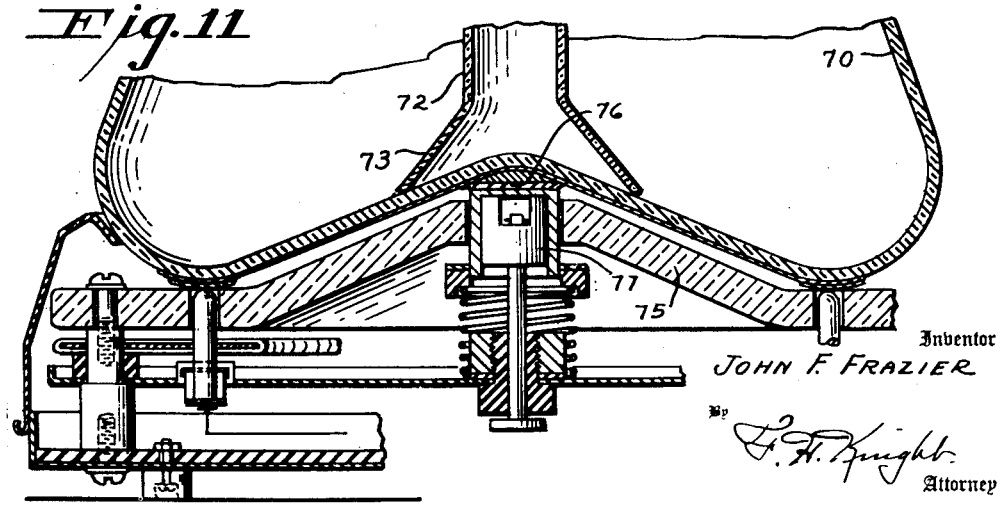
Fig. 11 is an enlarged fragmentary view in section of the lower portion of the apparatus of Fig. 10.

In the structure illustrated in Figs. 10 and 11, the lower bowl 70 differs from that shown in Fig. 1 only to the extent that the bottom extends considerably farther up into the bowl, and the upper bowl 71 has the lower end of its tubulation 72 provided with a flared portion 73 extending out over a considerable portion of the central bottom area of the bowl 70.

The base or stand assembly employed is similar to that already described except that its bowl support 75 is of a contour to match that of the bottom of bowl 70, and the parts within the base are changed in proportion to cooperate with parts identically corresponding to those already described.

*Automatic coffee maker operation*

The operation is initiated in the identical manner as that described in connection with the manual coffee maker, lever 60 being moved from position 1 to position 4, and then returned to position 3. When the liquid in bowl 70 is driven up into bowl 71, the bottom surface of bowl 70, covered by tubulation 72 and its flared portion 73, is immediately deprived of a liquid covering, since it is at a level above the bottom of the flared portion of the tubulation, and therefore immediately starts to heat up. After a time interval calculated to be sufficient to produce the average desired strength of brew, its armature 76 attains the Curie point temperature so that the magnet 77 drops and opens the circuit to the bowl heating element, thus allowing the subsequent return of the brew to the lower bowl.

As will be obvious, since the circuits to electrodes 39, 42 and 43 are automatically opened at contacts 58 and 60a, contact spring 56 and its associated contact may be omitted if desired and the latch member simplified by omission of position 3 therefrom. With the foregoing changes made, terminal X of the current source would be connected directly to the lower one of the contacts 58.

*General utility assembly*

In the form of the invention depicted in Figs. 12 and 13, the vessel 80 is illustrated as having a bottom configuration more suitable for general use than are the lower bowls of the described structures. Vessel 80 is provided with a heating element 81 and terminals 88 and 99 similar to those already described.

The stand assembly has been much simplified in that the heating element of the former structures has been omitted, as has been the control lever and its associated latch. Electrodes 82 and 83 are arranged on a support 84 in the same fashion as in the formerly described structures. The support 84 is also provided with a magnet 85, and a depending post 86 carrying a contact actuating disk 87 as in the former structures. The normal position of parts 85, 86, and 87 is determined by an adjustable stop 88′ engaged by the disk 87. Surrounding magnet 85 is an electrode 89 to the bottom end of which is fixed a magnet-retaining armature 90. Surrounding the upper portion of electrode 89, and rigidly secured thereto, is a flanged plunger 91 held down over a helical spring 93 by a guide member 94, attached to support 84.

Arranged on the underside of support 84 are contact springs 95 and 96 tensioned or biased to tend to engage their associated contacts 97 and 98, but held in their open position by weight of the magnet assembly. Contact 97 is connected to the electrode 89, and contact 98 is connected to the electrodes 82 and 83. Contacts 95 and 96 are connected to the respective X and Y current source terminals, and accordingly when in engagement with contacts 97 and 98, supply operating potential to the heating element of vessel 80.

*Operation*

When vessel 80 is placed on its support, its armature terminal 88 engages the electrode 89 and moves its downward, thus separating the armature 90 from magnet 85. As the vessel comes to rest on the support, the gap between armature 88 and magnet 85 is reduced to such value that, assisted by the tension of springs 95 and 96, it is raised by magnetic attraction to the position shown in Fig. 13, so that contacts 95, 97 and 96, 98, close to energize the vessel heating element. As in the formerly described structures, the vessel armature is of a magnetic alloy with a low temperature Curie point so that it becomes non-magnetic and therefore releases the magnet 85 in case the vessel attains a temperature approaching that detrimental to the vessel or heating element.

*Additional suggested modified structures*

In the forms of the invention described, the vessel in each instance carries the armature toward which the magnet is attracted to apply power to the stand electrodes. There may be instances in which, for one reason or another, it is undesirable to attach an armature to the bottom of the vessel. Under such circumstances the armature may be fixed to the top of the center electrode. In Fig. 14 a cap electrode 101 is illustrated which is interchangeable with cap electrode 39, and is provided with an armature 100 on the underside of its top wall which will function in the same capacity as do armatures 18 and 76, with exceptions to be noted later.

In Fig. 15 is illustrated an electrode 102, which is interchangeable with electrode 89 and is provided with an armature 103 to replace that provided on vessel 80.

Structures modified in accordance with the disclosures of Figs. 14 and 15 will operate in the identical fashion as do the assemblies of Figs. 1–13, except that the safety feature against accidental shock is sacrificed, in that, with the armature associated with the electrode, it is possible to bring the armature into magnetic attractive relation with the magnet and apply power to the electrodes without a vessel being arranged on the stand.

It will be appreciated from the foregoing that the invention may be embodied in a substantial variety of forms of equipment which will occur to those skilled in the art upon a reading of applicant's specification.

What is claimed is:

1. An article having an electric heating element, a terminal for said heating element arranged on said article, an article support having an electrode for engagement with said terminal when the article is arranged on said support, a switch for the application of an electrical potential to said electrode; a plunger carried by said support constructed and arranged to, in a first position, hold said switch open and to, in a second position, enable said switch to close; a magnet attached to said plunger, an armature acting on said magnet to bias said plunger to said first position, means actuated by the article as it is placed on said support to release said armature from said magnet, and a second armature carried by said article and brought into the effective field of said magnet at a location to bias said plunger to said second position as the article comes to rest on said support so as to move said plunger out of operative relation with said switch to enable it to close.

2. An article having a heating element associated therewith and having supporting surfaces comprising terminals of said heating element, a support for said article having electrodes for engagement by said terminals, a switch to connect a source of current to said electrodes, a magnet associated with said support movable from a first to a second position to enable said switch to close, an armature adapted to act on said magnet to hold it in said first position, means actuated by said article upon its placement on said support to release said armature from said magnet, and a second armature carried by said article and brought into the effective field of said magnet by the arrangement of said article on said support to move said magnet to said second position.

3. In combination an apertured support having electrodes, a hollow member projecting through an aperture in the support, a resilient support for said member, an armature attached to the lower end of said member, a magnet arranged within said member adapted to be attracted into engagement with said armature and having a depending member, a stop against which said depending member is held by the attraction of said magnet to said armature, a power supply circuit to said electrodes including contact springs tensioned to attain one position but held at an alternative position by said magnet while the same remains attracted to said armature, and an electrical appliance having terminals for engagement by said electrodes, said appliance having a bottom armature adapted to depress said element when deposited on said support to break said first armature away from said magnet and to bring said second armature into its effective field whereby said magnet by its attraction to said second armature frees said contact springs for movement to said one position under their own tension.

4. A plunger adapted for up and down movement between alternative positions, a magnet arranged on said plunger, a resiliently supported member surrounding said magnet and having attached to the bottom thereof an armature to which said magnet is attracted, a pair of control springs biased to a closed position and held in an open position by said plunger when said magnet is attracted to said armature, means for moving said member downward to release said armature from the effective field of said magnet, and a second armature associated with said means and brought into the effective field of said magnet as said member is moved downward so that said magnet is attracted thereto to move said plunger to a position to permit closure of said control springs.

5. In combination, an article of ware carrying an armature and also carrying an electric current heating element having exposed terminals, a support for said article having current supply electrodes for engagement by said terminals when the article is placed on said support, a movable permanent magnet associated with said support, means to normally hold said magnet in one position, means actuated by the article as it is placed on said support to disengage the magnet and enable it to be attracted to an alternative position toward said armature, and means under the influence of said magnet to automatically connect a source of electrical potential to said electrodes when said magnet is in such alternative position.

JOHN F. FRAZIER.

REFERENCES CITED

The following references are of record in the file of this patent:

UNITED STATES PATENTS

| Number | Name | Date |
|---|---|---|
| 1,508,035 | Underwood | Sept. 9, 1924 |
| 1,655,852 | Adams | Jan. 10, 1928 |
| 1,994,323 | Peirce | Mar. 12, 1935 |
| 2,181,090 | Lucia | Nov. 21, 1939 |
| 2,207,871 | Myers | July 16, 1940 |
| 2,269,689 | Reichold | Jan. 13, 1942 |
| 2,314,225 | Leece | Mar. 16, 1943 |
| 2,339,087 | Mantz | Jan. 11, 1944 |
| 2,422,580 | Meier | June 17, 1947 |
| 2,445,591 | Sullivan | July 20, 1948 |